United States Patent
Putnins et al.

(10) Patent No.: US 10,142,713 B2
(45) Date of Patent: Nov. 27, 2018

(54) DYNAMIC SELECTION OF MANAGEMENT INFORMATION BASES

(71) Applicant: Verizon Patent and Licensing Inc., Arlington, VA (US)

(72) Inventors: Zigmunds A. Putnins, Ridgewood, NJ (US); Denis A. Khotimsky, Westborough, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/444,709

(22) Filed: Feb. 28, 2017

(65) Prior Publication Data

US 2018/0249232 A1 Aug. 30, 2018

(51) Int. Cl.
*H04Q 11/00* (2006.01)

(52) U.S. Cl.
CPC . *H04Q 11/0067* (2013.01); *H04Q 2011/0083* (2013.01)

(58) Field of Classification Search
CPC .................. H04Q 11/0067; H04Q 2011/0083
See application file for complete search history.

(56) References Cited

U.S. PATENT DOCUMENTS

| 2008/0050118 A1* | 2/2008 | Haran | H04Q 11/0067 398/63 |
| 2017/0063462 A1* | 3/2017 | Luo | H04B 10/272 |
| 2017/0366254 A1* | 12/2017 | Gao et al. | H04B 10/27 |

FOREIGN PATENT DOCUMENTS

EP 2827532 A1 * 1/2015 ......... H04L 41/0843

* cited by examiner

*Primary Examiner* — Leslie C Pascal (57) ABSTRACT

A method, a device, and a non-transitory storage medium provide to transmit to an optical network unit, a first message that queries the optical network unit for managed information bases supported by the optical network unit; receive a second message from the optical network unit, which indicates the managed information bases supported by the optical network unit; compare the managed information bases supported by the optical line terminal with the managed information bases supported by the optical network unit; select one of the managed information bases supported by the optical line terminal that is also supported by the optical network unit; transmit to the optical network unit, a third message, which indicates the selected managed information base supported by the optical line terminal and the optical network unit; and receive a fourth message from the optical network unit, which indicates whether the selected managed information bases is successfully instantiated.

20 Claims, 7 Drawing Sheets

DYNAMIC SELECTION OF MANAGEMENT INFORMATION BASES

BACKGROUND

In a passive optical network (PON), an optical line termination (OLT) (also known as an optical line terminal) manages an optical network unit (ONU) or an optical network termination (ONT) (also known as an optical network terminal) based on messaging via an Optical Management Communications Interface (OMCI) channel. For example, the OMCI channel is used to read and write attributes of managed entities (MEs). A managed entity is a representation of a logical element or a physical element of the ONU or the ONT.

In 2010, the International Telecommunication Union-Telecommunication (ITU-T) authored an OMCI specification known as Recommendation G.988. Recommendation G.988 specifies, among other things, the managed entities of a protocol-independent management information base (MIB) that models the exchange of information between the OLT and the ONU.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

ITU-T Recommendation G.988 (Oct. 2012), which is incorporated in its entirety by reference, defines a number of options that are left for vendor preference, such as specifying proprietary managed entities, attributes, and methods within what is known as "vendor-specific" code point space. Recommendation G.988 also omits coverage on some high-scale sequencing of actions in the provisioning of complex services.

In PON deployments, the OLT and the ONU are typically from the same vendor or the same partner vendor. This framework effectively encourages single-vendor non-interoperable PON environments. Unfortunately, there are not current standards or procedures to support dynamic selection of G.988-compliant managed information bases (MIBs) involving OLTs and ONUs that are not from the same vendor or the same partner vendor.

According to exemplary embodiments, an MIB configuration service is described. According to exemplary embodiments, the MIB configuration service provides interoperability between optical equipment from different vendors in a PON. For example, the optical equipment may be an OLT of a service provider endpoint, and an ONU at the customer premise. The term ONU is intended to be broadly interpreted as an ONU, an ONT, a Multi-Dwelling Unit (MDU), or a Single Family Unit (SFU). The MIB configuration service may be implemented in various types of PONs, such as, for example, a Gigabit PON (GPON), a 10G-PON, a 10G Symmetrical PON (XGS-PON), an Ethernet PON (EPON), a 10G-EPON, a Next Generation-PON2 (NG-PON2), or other type of legacy, current, or future generation PON.

According to an exemplary embodiment, a managed entity is instantiated, at the ONU, which reports the various MIBs supported by the ONU. According to an exemplary implementation, the managed entity is instantiated autonomously by the ONU. According to another exemplary implementation, the managed entity is instantiated based on a request from the OLT. For example, the OLT may issue a create command or action to the ONU for instantiating the managed entity.

According to an exemplary embodiment, the OLT selects one of the reported MIBs. According to an exemplary implementation, the OLT selects the MIB based on the application (e.g., business applications, voice-only applications, SFU applications, etc.) for which the ONU is targeted. According to an exemplary embodiment, the OLT directs the ONU to use the selected MIB. According to an exemplary implementation, the OLT sets an attribute value of the managed entity that indicates the selected MIB.

According to an exemplary embodiment, the ONU attempts to use the selected MIB. According to an exemplary embodiment, the ONU reports the success or failure of the use of the selected MIB to the OLT. When the report indicates success, the OLT may monitor the status of the running of the selected MIB. Additionally, for example, when OLT redundancy is used and/or OLT control software switchover is used, an OLT may query the ONU to determine which MIB the ONU is currently supporting or running. According to an exemplary implementation, the ONU sets an attribute value of the managed entity that indicates the MIB currently running. The OLT may periodically or otherwise monitor the attribute value. When the report indicates failure, the OLT may select another one of the reported MIBs.

According to another exemplary embodiment, a managed entity is instantiated, at the ONU, which allows the OLT to challenge the ONU to instantiate a MIB, which is supported by the OLT, and to receive a response from the ONU that indicates whether the MIB is successfully instantiated. According to an exemplary implementation, the managed entity is instantiated autonomously by the ONU. According to another exemplary implementation, the managed entity is instantiated based on a request from the OLT. For example, the OLT may issue a create command or action to the ONU for instantiating the managed entity.

According to an exemplary embodiment, the OLT reports a list of one or multiple MIBs, which the OLT supports, to the ONU. According to an exemplary embodiment, the ONU selects one of the reported MIBs when the ONU determines it supports one of the reported MIBs. According to an exemplary embodiment, the ONU attempts to use the selected MIB. According to an exemplary embodiment, the ONU reports the success or failure of the use of the selected MIB to the OLT. When the report indicates success, the OLT may monitor the status of the running of the selected MIB. According to an exemplary implementation, the ONU sets an attribute value of the managed entity that indicates the MIB currently running. The OLT may periodically or otherwise monitor the attribute value. When the report indicates failure, the ONU may select another one of the reported MIBs. According to an exemplary embodiment, when the ONU determines that it does not support any MIB included in the list, the ONU transmits a message to the OLT indicating that it does not support any MIB included in the list.

Figure 1:
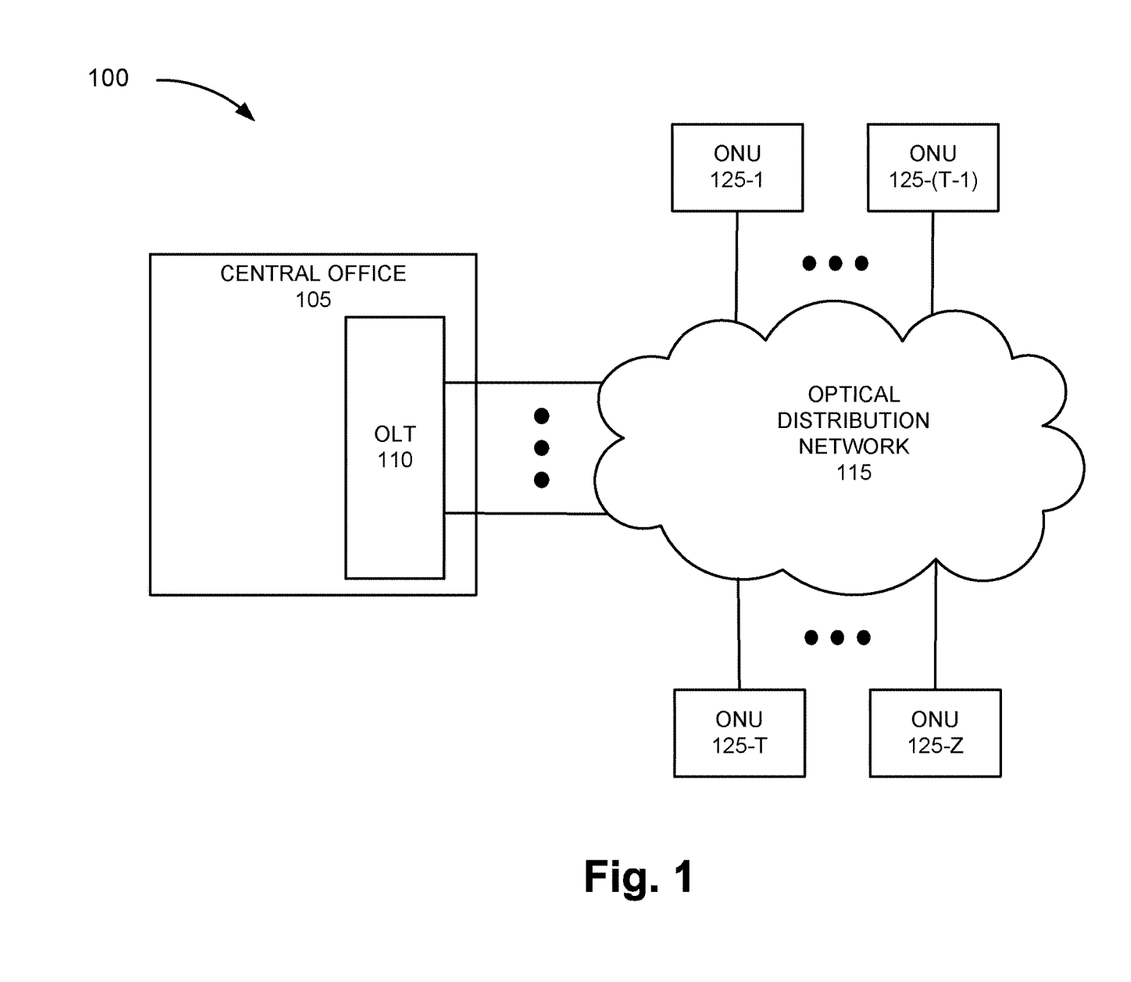
FIG. 1 is a diagram illustrating an exemplary environment in which an exemplary embodiment of an MIB configuration service may be implemented.

FIG. 1 is a diagram illustrating an exemplary environment 100 in which an exemplary embodiment of a MIB configuration service may be implemented. As illustrated, environment 100 includes a central office 105. Central office 105 includes an OLT 110. Additionally, environment 100 includes an optical distribution network (ODN) 115, and ONUs 125-1 through 125-Z (also referred to as ONUs 125, or individually or generally as ONU 125). The connections between OLT 110, ODN 115, and ONU 125 include optical fibers. According to an exemplary embodiment, OLT 110, ODN 115, and ONU 125 form a PON.

The number and arrangement of devices in environment 100 are exemplary. According to other embodiments, environment 100 may include additional devices and/or differently arranged devices, than those illustrated in FIG. 1. Additionally, the number and arrangement of connections are exemplary.

Central office 105 is a distribution node of a service provider. Central office 105 hosts OLT 110 and other elements not illustrated (e.g., an optical distribution frame (ODF), etc.), and provides electrical power. According to various exemplary implementations, central office 105 may or may not include core network equipment. For example, the core network equipment may include television provider equipment, Internet provider equipment, and/or telephone provider equipment (e.g., packet-switched, etc.).

OLT 110 includes an optical device that performs various functions, such as traffic scheduling, buffer controlling, and bandwidth allocating. According to exemplary embodiments, OLT 110 includes logic that provides the MIB configuration service, as described herein.

ODN 115 includes an optical network that provides an optical transmission medium for the connection between OLT 110 and ONUs 125. Although not illustrated, ODN 115 may include optical fibers, fiber optic connectors, optical splitters/combiners, and other passive optical components.

ONU 125 includes an optical device that provides network-side line termination and user-side line termination functions. For example, ONU 125 performs various functions, such as converting an optical signal in the optical fiber to electrical form, and multiplexing and de-multiplexing. ONU 125 may be connected to various end devices or user devices. According to exemplary embodiments, ONU 125 includes logic that provides the MIB configuration service, as described herein.

Figure 2:
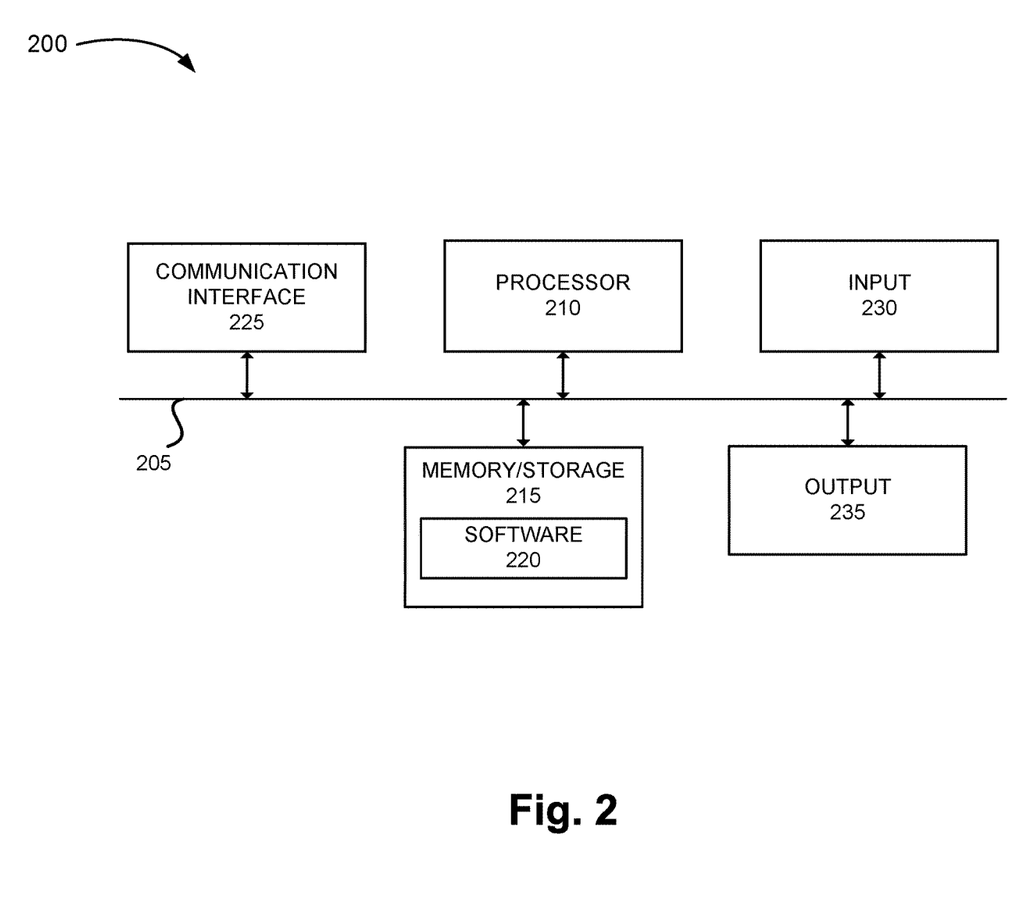
FIG. 2 is a diagram illustrating exemplary components of a device that may correspond to one or more of the devices illustrated herein.

FIG. 2 is a diagram illustrating exemplary components of a device 200 that may be included in one or more of the devices described herein. For example, some or all of the components of device 200 may be included in OLT 110 and ONU 125. As illustrated in FIG. 2, device 200 includes a bus 205, a processor 210, a memory/storage 215 that stores software 220 and other data, a communication interface 225, an input 230, and an output 235. According to other embodiments, device 200 may include fewer components, additional components, different components, and/or a different arrangement of components than those illustrated in FIG. 2 and described herein. Additionally, or alternatively, according to other embodiments, multiple components may be combined into a single component. For example, processor 210, memory/storage 215, and communication interface 225 may be combined.

Bus 205 includes a path that permits communication among the components of device 200. For example, bus 205 may include a system bus, an address bus, a data bus, and/or a control bus. Bus 205 may also include bus drivers, bus arbiters, bus interfaces, clocks, and so forth.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc.

Processor 210 may control the overall operation or a portion of operation(s) performed by device 200. Processor 210 may perform one or multiple operations based on an operating system and/or various applications or computer programs (e.g., software 220). Processor 210 may access instructions from memory/storage 215, from other components of device 200, and/or from a source external to device 200 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 215 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 215 may include drives for reading from and writing to the storage medium.

Memory/storage 215 may be external to and/or removable from device 200, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 215 may store data, software, and/or instructions related to the operation of device 200.

Software 220 includes an application or a program that provides a function and/or a process. As an example, with reference to OLT 110 and ONU 125, software 220 may include an application that, when executed by processor 210, provides the functions of the MIB configuration service, as described herein. Software 220 may also include firmware, middleware, microcode, hardware description language (HDL), and/or other form of instruction. Software 220 may include an operating system.

Communication interface 225 permits device 200 to communicate with other devices, networks, systems, and/or the like. Communication interface 225 includes one or multiple optical interfaces. Communication interface 225 may include one or multiple wired and/or wireless interfaces. Communication interface 225 includes one or multiple transmitters and receivers, or transceivers. Communication interface 225 may operate according to a protocol stack and a communication standard. Communication interface 225 may include one or multiple line cards. For example, communication interface 225 may include processor 210, memory/storage 215, and software 220.

Input 230 permits an input into device 200. For example, input 230 may include a keyboard, a mouse, a display, a touchscreen, a touchless screen, a button, a switch, an input port, speech recognition logic, and/or some other type of visual, auditory, tactile, etc., input component. Output 235 permits an output from device 200. For example, output 235 may include a speaker, a display, a touchscreen, a touchless screen, a light, an output port, and/or some other type of visual, auditory, tactile, etc., output component.

Device 200 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, device 200 performs a process described herein based on the execution of hardware (processor 210, etc.).

Figure 3A:
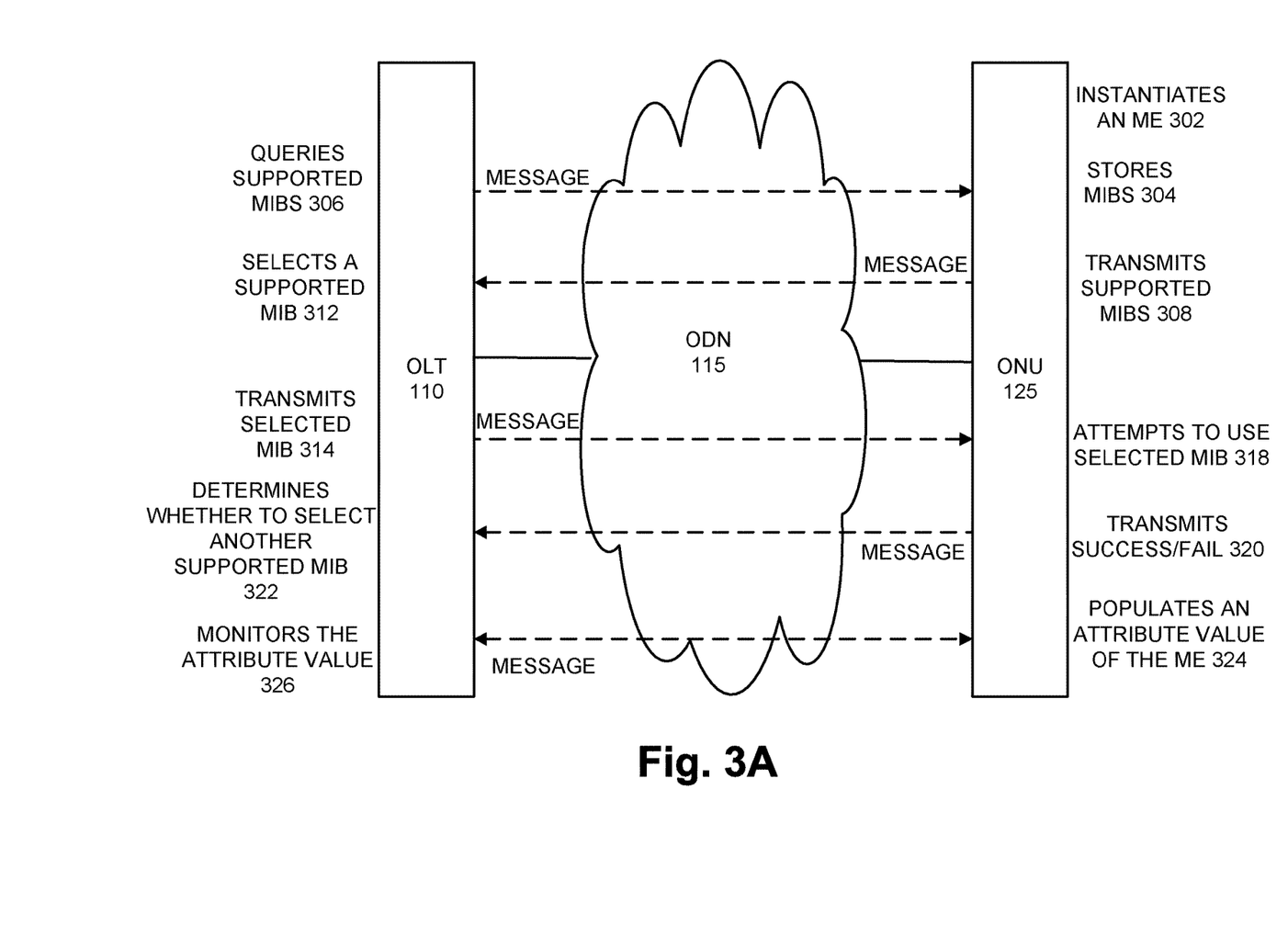
FIGS. 3A and 3B are diagrams illustrating exemplary processes of exemplary embodiments of the MIB configuration service.
Figure 3B:
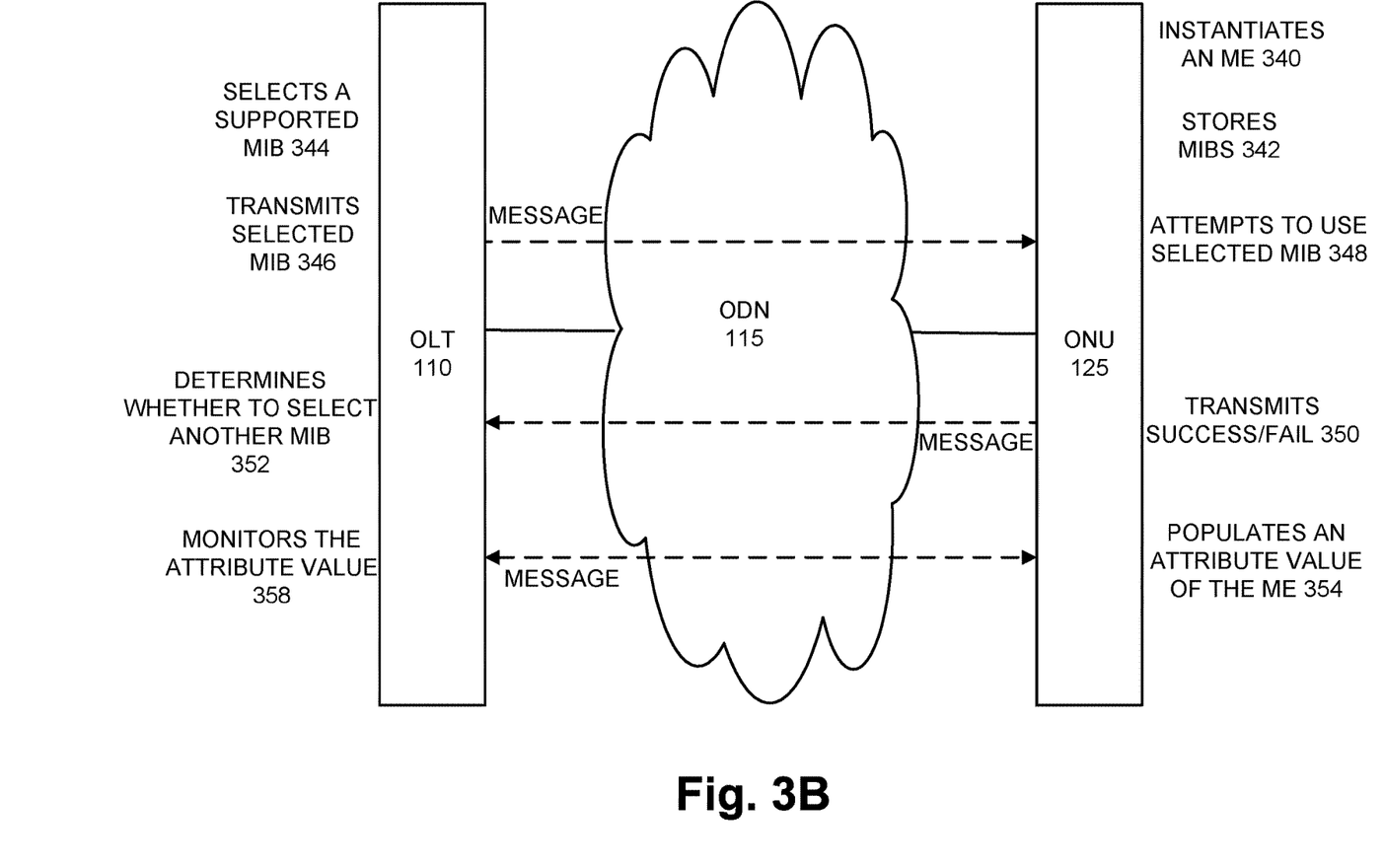

FIGS. 3A and 3B are diagrams illustrating exemplary processes of exemplary embodiments of the MIB configuration service. As illustrated, according to various embodiments, the MIB configuration service provides for the exchange of messages. The messages described are exemplary. According to an exemplary embodiment, the messages are exchanged via the OMCI channel established between OLT 110 and ONU 125. According to an exemplary implementation, the messages are exchanged via the OMCI channel according to a master-slave management protocol in which OLT 110 is the master and ONU 125 is the slave. According to other exemplary implementations, one or multiple messages, as described herein, may be transmitted by ONU 125 to OLT 110 in an autonomous or non-master-slave manner. Additionally, according to various exemplary implementations, fewer, additional, and/or different messages may be exchanged. FIGS. 3A and 3B are further described in reference to the flow diagrams illustrated in FIGS. 4 and 5.

Figure 4A:
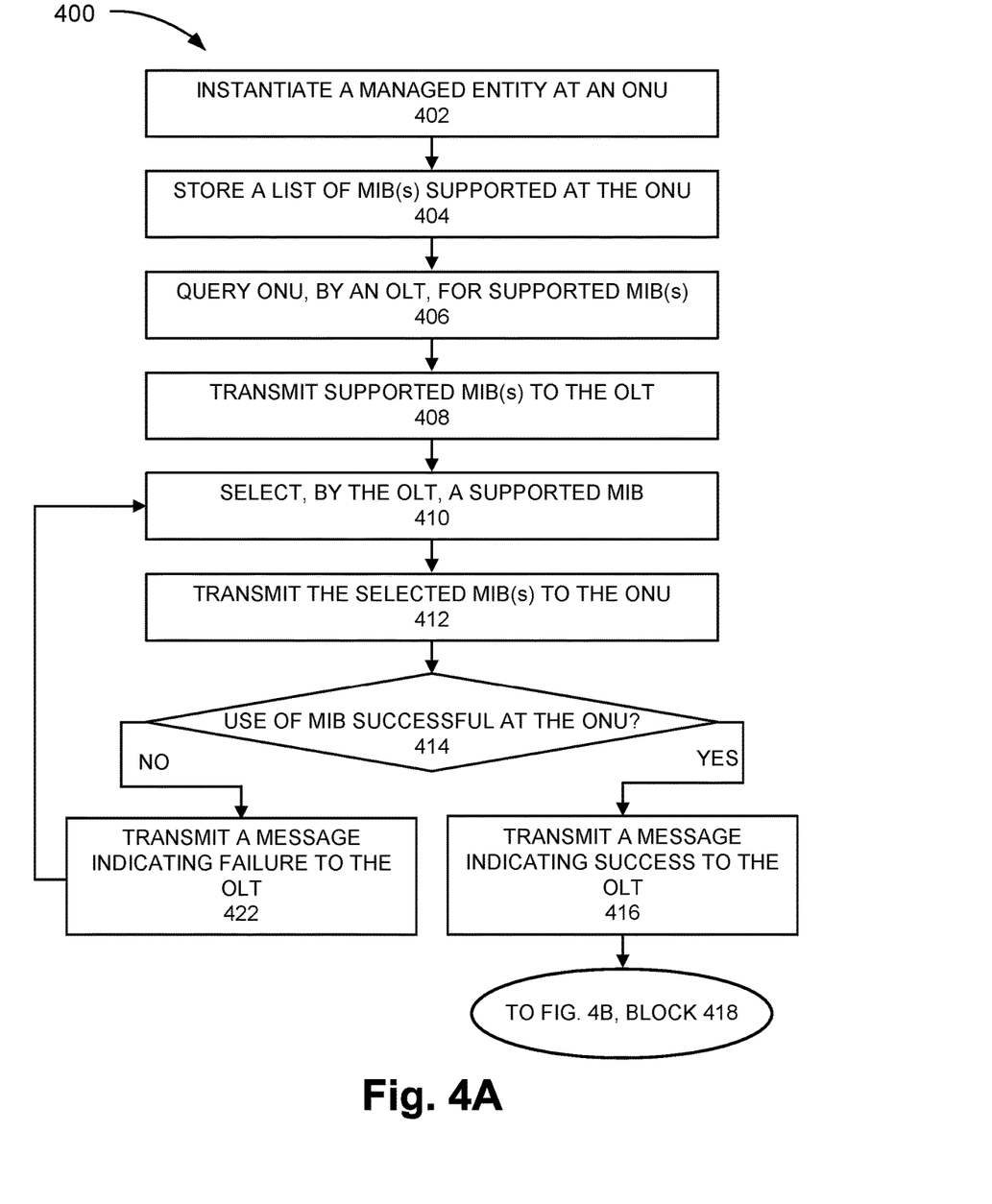
FIGS. 4A and 4B are flow diagrams illustrating an exemplary process of the MIB configuration service performed by the OLT and the ONU.
Figure 4B:
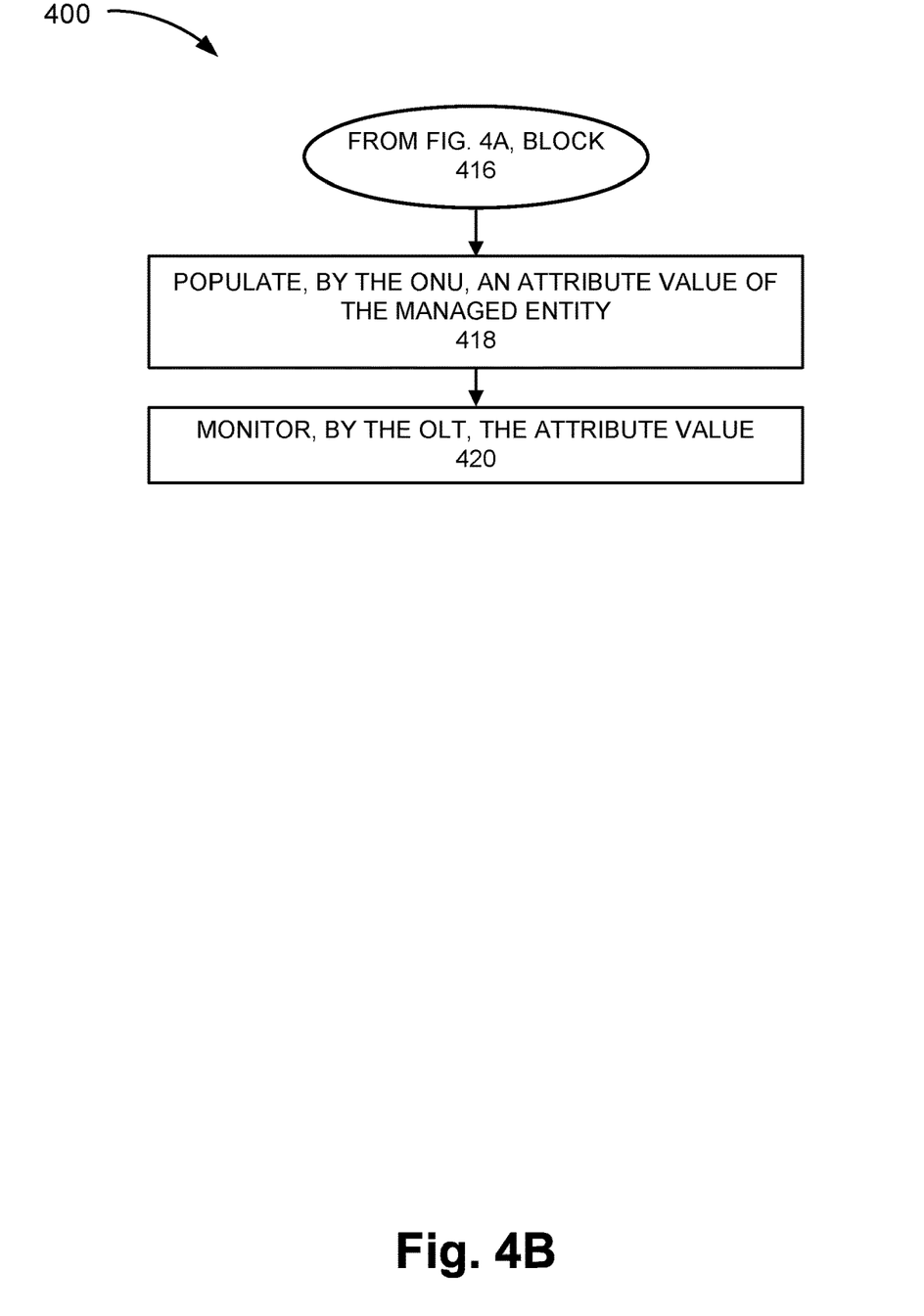

FIGS. 4A and 4B are diagrams illustrating an exemplary process 400 of the MIB configuration service. OLT 110 and ONU 125 perform steps of process 400. For example, processor 210 executes software 220 to perform the steps illustrated in FIGS. 4A and 4B, and described herein. FIG. 3A illustrates exemplary operations performed and messages exchanged between OLT 110 and ONU 125 in accordance with process 400.

Referring to FIG. 4A, block 402, a managed entity is instantiated at an ONU. For example, ONU 125 instantiates the managed entity 302. According to an exemplary embodiment, the managed entity supports a reporting to OLT 110 of the MIB(s) ONU 125 can implement. As described herein, the managed entity includes various attributes and each attribute may be assigned an attribute value.

According to an exemplary implementation, the managed entity is instantiated during boot-up of ONU 125. For example, the managed entity may be instantiated during a power-up cycle, a system restart, a software restart, or during some other initialization process performed by ONU 125. According to other exemplary implementations, the managed entity is instantiated subsequent to boot-up of ONU 125. For example, the managed entity may be instantiated after a control channel (e.g., an OMCI channel) is established between OLT 110 and ONU 125, after ONU 125 registers with OLT 110, after a command to create the managed entity is received from OLT 110 via the control channel, or responsive to some other triggering event or time (e.g., invoked by a human operator, a change in hardware, etc.).

In block 404, a list of one or multiple MIBs supported by the ONU is stored. For example, ONU 125 stores data indicating the one or multiple MIBs 304 supported by ONU 125. As an example, ONU 125 may store data indicating a type of MIB (e.g., G.988 edition 2.0; XYZ vendor, version 3.1; etc.).

In block 406, an OLT queries the ONU for supported MIB(s). For example, OLT 110 generates and transmits a message to ONU 125 via the control channel. The message includes data that queries ONU 125 to provide one or multiple MIB(s) 306 supported by ONU 125.

In block 408, the supported MIB(s) is/are transmitted to the OLT. For example, in response to receiving and analyzing the message from OLT 110, ONU 125 retrieves the stored data indicating the one or multiple MIBs supported. ONU 125 generates and transmits a message, which carries data indicating the supported MIB(s) 308, to OLT 110. The message may also carry data pertaining to the managed entities afforded under the supported MIB.

In block 410, one of the supported MIB(s) is selected by the OLT. For example, in response to receiving and analyzing the message from ONU 125, OLT 110 selects one of the supported MIB(s) 312 indicated in the message. According to an exemplary implementation, OLT 110 compares the supported MIB(s) of ONU 125 with supported MIBs of OLT 110, which are stored by OLT 110. Based on the result of the comparison, OLT 110 identifies one or multiple mutually supported MIBs. According to an exemplary implementation, OLT 110 selects the MIB (e.g., a single MIB), which may be from among multiple supported MIBs, based on the applications and/or services for which ONU 125 is targeted. By way of example, OLT 110 may determine the types of applications and/or services regarding ONU 125 during the registration process with ONU 125.

In block 412, the selected MIB is transmitted to the ONU. For example, OLT 110 transmits a message 314, which indicates the selected MIB, to ONU 125. According to an exemplary implementation, an attribute value of the managed entity indicates the selected MIB.

In block 414, it is determined whether the selected MIB is successfully used. For example, in response to receiving and analyzing the message from OLT 110, ONU 125 attempts to instantiate the selected MIB 318.

When the selected MIB is successfully used (block 414—YES), a message, which indicates that the selected MIB is successfully used, is transmitted to the OLT (block 416). For example, when ONU 125 successfully instantiates the selected MIB, ONU 125 generates and transmits a message 320, which indicates that the selected MIB is successfully instantiated, to OLT 110. In response to receiving and analyzing the message, the OLT determines whether to select another MIB 322. For example, in this case, when the selected MIB is successfully instantiated, OLT 110 determines that another MIB selection is not necessary.

Referring to FIG. 4B, in block 418, an attribute value of the managed entity, which indicates that the selected MIB is successfully running on the ONU, is populated. For example, ONU 125 sets the attribute value 324 of the managed entity 316.

In block 420, the attribute value is monitored by the OLT. For example, OLT 110 may periodically and/or aperiodically read the attribute value 326 so as to identify the MIB currently running on the ONU 125.

Referring back to FIG. 4A, when the selected MIB is not successfully used (block 414-NO), a message, which indicates that the selected MIB is not successfully used, is transmitted to the OLT (block 422). For example, when ONU 125 fails to instantiate the selected MIB (e.g., due to error, etc.), ONU 125 generates and transmits a message 320, which indicates that the selected MIB is not successfully instantiated, to OLT 110. As illustrated in FIG. 4A, process 400 may return to block 410. For example, in response to receiving and analyzing the failure message from ONU 125, OLT 110 may select another one of the mutually supported MIBs in view of the types of applications and/or services regarding ONU 125.

Although FIGS. 4A and 4B illustrate an exemplary process 400 of the MIB configuration service, according to other embodiments, process 400 may include additional operations, fewer operations, and/or different operations than those illustrated in FIGS. 4A and 4B, and described herein. For example, in block 420, when OLT redundancy and/or OLT control software switchover is used, an OLT, other than OLT 110, may query and/or monitor the attribute value so as to identify the MIB currently running on ONU 125.

Figure 5:
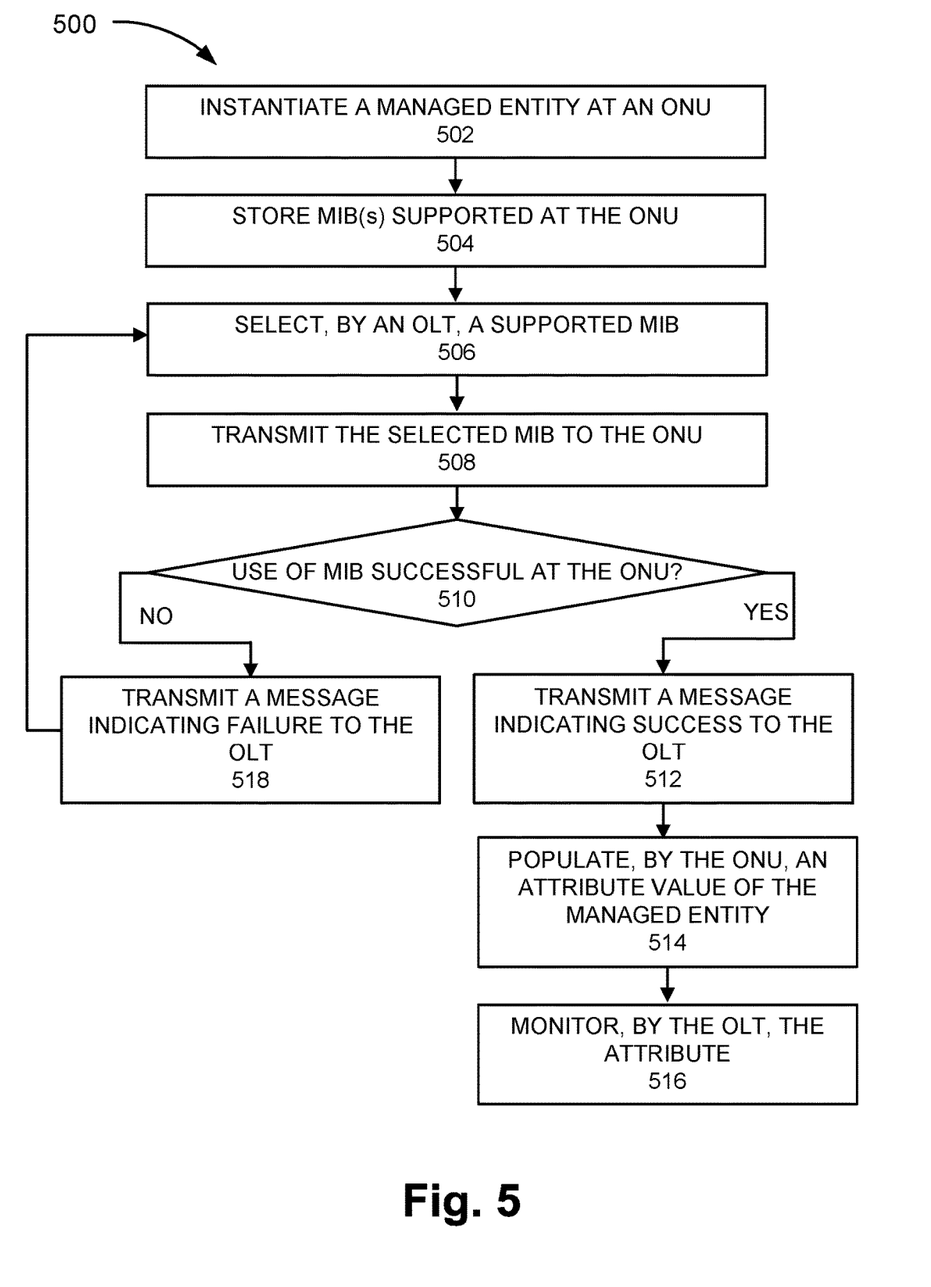
FIG. 5 is a flow diagram illustrating another exemplary process of the MIB configuration service performed by the OLT and the ONU.

FIG. 5 is a diagram illustrating another exemplary process 500 of the MIB configuration service. According to an exemplary embodiment, OLT 110 and ONU 125 perform steps of process 500. For example, processor 210 executes software 220 to perform the steps illustrated in FIG. 5, and described herein. FIG. 3B illustrates exemplary operations performed and messages exchanged between OLT 110 and ONU 125 in accordance with process 500. According to this example, it is assumed that ONU 125 supports at least one MIB in common with OLT 110.

Referring to FIG. 5, in block 502, a managed entity is instantiated at an ONU. For example, ONU 125 instantiates the managed entity 340. According to an exemplary embodiment, the managed entity allows OLT 110 to challenge ONU 125 with a MIB to instantiate, which is supported by OLT 110, and to receive a response from ONU 125 that indicates whether the MIB is successfully instantiated by ONU 125. As described herein, the managed entity includes various attributes, each attribute being assigned an attribute value.

According to an exemplary implementation, the managed entity is instantiated during boot-up of ONU 125. For example, the managed entity may be instantiated during a power-up cycle, a system restart, a software restart, or during some other initialization process performed by ONU 125. According to other exemplary implementations, the managed entity is instantiated subsequent to boot-up of ONU 125. For example, the managed entity may be instantiated after a control channel (e.g., an OMCI channel) is established between OLT 110 and ONU 125, after ONU 125 registers with OLT 110, after a command to create the managed entity is received from OLT 110 via the control channel, or responsive to some other triggering event or time (e.g., invoked by a human operator, a change in hardware, etc.).

In block 504, the MIB(s) supported by the ONU are stored. For example, ONU 125 stores data indicating the one or multiple MIBs 342 supported by ONU 125. As an example, ONU 125 may store data indicating a type of MIB (e.g., G.988 edition 2.0; XYZ vendor, version 3.1; etc.).

In block 506, a supported MIB(s) is selected by the OLT. For example, OLT 110 stores data that indicates the type of MIBs supported by OLT 110. According to an exemplary implementation, OLT 110 selects the supported MIB(s) 344 based on an order of preference. For example, the order of preference may be an administrative configuration. According to another exemplary implementation, OLT 110 selects the supported MIB(s) 344 based on the applications and/or services for which ONU 125 is targeted. By way of example, OLT 110 may determine the types of applications and/or services regarding ONU 125 during the registration process with ONU 125.

In block 508, the selected MIB is transmitted to the ONU. For example, OLT 110 transmits a message 346, which indicates the selected type of MIB, to ONU 125. According to an exemplary implementation, an attribute value of the managed entity indicates the selected type of MIB.

In block 510, it is determined whether the selected MIB is successfully used. For example, in response to receiving and analyzing the message from OLT 110, ONU 125 attempts to instantiate the selected type of MIB 348. It is assumed that ONU 125 stores a type of MIB in common with the selected type of MIB.

When the selected MIB is successfully used (block 510—YES), a message, which indicates that the selected MIB is successfully used, is transmitted to the OLT (block 512). For example, when ONU 125 successfully instantiates the selected MIB, ONU 125 generates and transmits a message 350, which indicates that the selected MIB is successfully instantiated, to OLT 110. In response to receiving and analyzing the message, the OLT determines whether to select another MIB 352. For example, in this case, when the selected MIB is successfully instantiated, OLT 110 determines that another MIB selection is not necessary.

In block 514, an attribute value of the managed entity, which indicates that the selected MIB is successfully running on the ONU, is populated. For example, ONU 125 sets the attribute value of the managed entity 354.

In block 516, the attribute value is monitored by the OLT. For example, OLT 110 may periodically and/or aperiodically read the attribute value 358 so as to identify the MIB currently running on the ONU 125.

Referring back to block 510, when the selected MIB is not successfully used (block 510-NO), a message, which indicates that the selected MIB is not successfully used, is transmitted to the OLT (block 518). For example, when ONU 125 fails to instantiate the selected MIB (e.g., due to error, etc.), ONU 125 generates and transmits a message 350, which indicates that the selected MIB is not successfully instantiated, to OLT 110. As illustrated in FIG. 5, process 500 may return to block 506. For example, in response to receiving and analyzing the failure message from ONU 125, OLT 110 may select another one of the mutually-supported MIBs in view of the types of applications and/or services regarding ONU 125.

Although FIG. 5 illustrates an exemplary process 500 of the MIB configuration service, according to other embodiments, process 500 may include additional operations, fewer operations, and/or different operations than those illustrated in FIG. 5, and described herein. For example, in block 510, when ONU 125 determines that it does not support the type of MIB indicated in the message from OLT 110, ONU 125 may generate and transmit a message, which indicates a rejection of the challenge (e.g., does not support the type of MIB), to OLT 110. Additionally, or alternatively, ONU 125 may generate and transmit a message, which indicates one or multiple types of MIBs that are supported, to OLT 110.

The foregoing description of embodiments provides illustration, but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while series of blocks have been described with regard to the processes illustrated in FIGS. 4A, 4B, and 5, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 210, etc.), or a combination of hardware and software (e.g., software 220). The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 210) of a computational device. A non-transitory storage medium includes one or more of the storage mediums described in relation to memory/storage 215.

No element, act, or instruction described in the present application should be construed as critical or essential to the embodiments described herein unless explicitly described as such.

What is claimed is:

1. A method comprising:
    transmitting, by an optical line terminal and to an optical network unit of a passive optical network, a first message that queries the optical network unit for one or more managed information bases supported by the optical network unit;
    receiving, by the optical line terminal and responsive to the first message, a second message from the optical network unit, which indicates the one or more managed information bases supported by the optical network unit;
    comparing, by the optical line terminal and based on the receiving, one or more managed information bases supported by the optical line terminal with the one or more managed information bases supported by the optical network unit;
    selecting, by the optical line terminal and based on the comparing, one of the one or more managed information bases supported by the optical line terminal that is also supported by the optical network unit;
    transmitting, by the optical line terminal and based on the selecting, a third message to the optical network unit, which indicates the selected one of the one or more managed information bases supported by the optical line terminal and also supported by the optical network unit;
    receiving, by the optical line terminal and responsive to the third message, a fourth message from the optical network unit, which indicates whether the selected one of the one or more managed information bases is successfully instantiated; and
    selecting, by the optical line terminal, another one of managed information bases supported by the optical network unit when the fourth message indicates that the selected one of the one or more managed information bases is not successfully instantiated by the optical network unit.

2. The method of claim 1, further comprising:
    instantiating, by the optical network unit, a managed entity that supports a reporting to the optical line terminal of the one or more managed information bases supported by the optical network unit, in response to receiving the first message.

3. The method of claim 2, further comprising:
    populating, by the optical network unit, a first attribute value of the managed entity that indicates the selected one of the one or more managed information bases is operating on the optical network unit; and
    storing, by the optical network unit and based on the populating, the first attribute value.

4. The method of claim 3, further comprising:
    monitoring, by the optical line terminal, the first attribute value subsequent to receiving the fourth message.

5. The method of claim 2, wherein the second message includes one or more attribute values of the managed entity that indicate the one or more managed information bases supported by the optical network unit.

6. The method of claim 2, wherein the third message includes a second attribute value of the managed entity that indicates the selected one of the one or more managed information bases supported by the optical line terminal and also supported by the optical network unit.

7. The method of claim 1, wherein the selecting further comprises:
selecting, by the optical line terminal, the one of the one or more managed information bases supported by the optical line terminal that is also supported by the optical network unit, based on at least one of an application or a service for which the optical network unit is targeted.

8. The method of claim 1, further comprising:
transmitting, by the optical line terminal, a fifth message to the optical network unit, which indicates the selected another one of the one or more managed information bases supported by the optical line terminal and also supported by the optical network unit.

9. A system comprising:
an optical line terminal of a passive optical network, comprising:
a first communication interface;
a first memory, wherein the first memory stores first instructions; and
a first processor, wherein the first processor executes the first instructions to:
transmit, via the first communication interface and to an optical network unit of the passive optical network, a first message that queries the optical network unit for one or more managed information bases supported by the optical network unit;
receive, via the first communication interface and responsive to the first message, a second message from the optical network unit, which indicates the one or more managed information bases supported by the optical network unit;
compare, based on the receipt of the second message, one or more managed information bases supported by the optical line terminal with the one or more managed information bases supported by the optical network unit;
select, based on the comparison, one of the one or more managed information bases supported by the optical line terminal that is also supported by the optical network unit;
transmit, via the first communication interface and based on the selection, a third message to the optical network unit, which indicates the selected one of the one or more managed information bases supported by the optical line terminal and also supported by the optical network unit;
receive, via the first communication interface and responsive to the third message, a fourth message from the optical network unit, which indicates whether the selected one of the one or more managed information bases is successfully instantiated; and
select another one of managed information bases supported by the optical network unit when the fourth message indicates that the selected one of the one or more managed information bases is not successfully instantiated by the optical network unit.

10. The system of claim 9, further comprising:
the optical network unit comprising:
a second communication interface;
a second memory, wherein the second memory stores second instructions; and
a second processor, wherein the second processor executes the second instructions to:
instantiate a managed entity that supports a reporting to the optical line terminal of the one or more managed information bases supported by the optical network unit, in response to the receipt of the first message.

11. The system of claim 10, wherein the second processor further executes the second instructions to:
populate a first attribute value of the managed entity that indicates the selected one of the one or more managed information bases is operating on the optical network unit; and
store the first attribute value.

12. The system of claim 11, wherein the first processor further executes the first instructions to:
monitor the first attribute value subsequent to the receipt of the fourth message.

13. The system of claim 10, wherein the second message includes one or more attribute values of the managed entity that indicate the one or more managed information bases supported by the optical network unit.

14. The system of claim 10, wherein the third message includes a second attribute value of the managed entity that indicates the selected one of the one or more managed information bases supported by the optical line terminal and also supported by the optical network unit.

15. The system of claim 9, wherein when selecting, the first processor further executes the first instructions to:
select the one of the one or more managed information bases supported by the optical line terminal that is also supported by the optical network unit, based on at least one of an application or a service for which the optical network unit is targeted.

16. The system of claim 9, wherein the first processor further executes the first instructions to:
transmit to the optical network unit a fifth message, which indicates the selected another one of the one or more managed information bases supported by the optical line terminal and also supported by the optical network unit.

17. A non-transitory, computer-readable storage medium storing instructions executable by a processor of an optical line terminal, which when executed cause the optical line terminal to:
transmit to an optical network unit, a first message that queries the optical network unit for one or more managed information bases supported by the optical network unit;
receive in response to the first message, a second message from the optical network unit, which indicates the one or more managed information bases supported by the optical network unit;
compare, based on the receipt of the second message, one or more managed information bases supported by the optical line terminal with the one or more managed information bases supported by the optical network unit;
select, based on the comparison, one of the one or more managed information bases supported by the optical line terminal that is also supported by the optical network unit;

transmit to the optical network unit, a third message, which indicates the selected one of the one or more managed information bases supported by the optical line terminal and also supported by the optical network unit;

receive, in response to the third message, a fourth message from the optical network unit, which indicates whether the selected one of the one or more managed information bases is successfully instantiated; and select another one of managed information bases supported by the optical network unit when the fourth message indicates that the selected one of the one or more managed information bases is not successfully instantiated by the optical network unit.

18. The non-transitory, computer-readable medium of claim 17, wherein the instructions to select further comprise instructions executable by the processor of the optical line terminal, which when executed cause the optical line terminal to:

select the one of the one or more managed information bases supported by the optical line terminal that is also supported by the optical network unit, based on at least one of an application or a service for which the optical network unit is targeted.

19. The non-transitory, computer-readable storage medium of claim 17, further storing instructions executable by the processor of the optical line terminal, which when executed cause the optical line terminal to:

transmit to the optical network unit a fifth message, which indicates the selected another one of the one or more managed information bases supported by the optical line terminal and also supported by the optical network unit.

20. The non-transitory, computer-readable storage medium of claim 17, further storing instructions executable by the processor of the optical line terminal, which when executed cause the optical line terminal to:

monitor, when the fourth message indicates that the selected one of the one or more managed information bases is successfully instantiated, an attribute value of a managed entity instantiated by the optical network unit, wherein the managed entity supports a reporting to the optical line terminal of the one or more managed information bases supported by the optical network unit, and the attribute value indicates that the selected one of the one or more managed information bases is operating on the optical network unit.

* * * * *